United States Patent
Barthel et al.

(10) Patent No.: US 6,635,972 B1
(45) Date of Patent: Oct. 21, 2003

(54) SWITCH AND SWITCH DEVICE FOR A MOTOR VEHICLE

(75) Inventors: Klaus Barthel, Rietheim-Weilheim (DE); Reinhold Hafen, Renquishausen (DE); Karl Mueller, Rottweil-Neufra (DE)

(73) Assignee: Marquardt GmbH, Rietheim-Weilheim (DE)

( * ) Notice: Subject to any disclaimer, the term of this patent is extended or adjusted under 35 U.S.C. 154(b) by 0 days.

(21) Appl. No.: 09/529,809

(22) PCT Filed: Oct. 10, 1998

(86) PCT No.: PCT/DE98/03000

§ 371 (c)(1),
(2), (4) Date: Apr. 20, 2000

(87) PCT Pub. No.: WO99/22389

PCT Pub. Date: May 6, 1999

(30) Foreign Application Priority Data

Oct. 25, 1997 (DE) .......................... 197 47 259

(51) Int. Cl.⁷ ................................................ H01H 1/58
(52) U.S. Cl. ..................... 307/9.1; 200/1 R; 307/116
(58) Field of Search ........................ 200/1 R; 307/9.1, 307/10.1, 116, 125; 701/36, 49

(56) References Cited

U.S. PATENT DOCUMENTS 4,346,419 A * 8/1982 Janniello ........................ 361/2
4,777,378 A * 10/1988 Talbot ......................... 307/10.1
5,262,602 A    11/1993 Mattson
5,523,633 A     6/1996 Imaizumi et al.
5,866,862 A *  2/1999 Riffil et al. ................... 200/5 R

FOREIGN PATENT DOCUMENTS

| DE | 27 02 264 | 10/1977 |
| DE | 31 37 975 | 3/1983 |
| DE | 32 14 989 | 11/1983 |
| DE | 39 13 266 | 1/1992 |
| DE | 43 02 032 | 8/1994 |
| DE | 43 38 171 | 4/1995 |
| DE | 195 12 277 | 10/1995 |
| DE | 195 48 216 | 6/1996 |
| DE | 195 36 196 | 12/1996 |

* cited by examiner

*Primary Examiner*—Fritz Fleming
(74) *Attorney, Agent, or Firm*—Morgan, Lewis & Bockius LLP

(57) ABSTRACT

The invention relates to an electrical switch, in particular for a motor vehicle. The switch has a housing in which a contact system is located. Electrical connections which are located on the housing lead to the contact system, of which electrical connections first electrical connections are used to apply a power voltage for a high power current, and second electrical connections are used to apply a signal voltage for a low signal current. Optionally and if required, one connection can carry the power current via the first electrical connections and/or the signal current via the second electrical connections. Electrical switches designed in such a way are particularly suitable for arrangement in a control panel for a motor vehicle.

15 Claims, 7 Drawing Sheets

SWITCH AND SWITCH DEVICE FOR A MOTOR VEHICLE

FIELD OF THE INVENTION

The invention relates to an electrical switch as claimed in the precharacterizing clause of patent claim 1, and to a switch arrangement comprising a plurality of electrical switches.

BACKGROUND OF THE INVENTION

Electrical switches are used in motor vehicles, as control switches for switching the motor vehicle lighting, the windshield wipers, the rear windshield heating, the electric window winders, the internal central locking and other functions on and off. A number of such switches can be combined as control panels in the dashboard, in the center console or the like.

Control switches which are suitable for use in motor vehicles are known, for example, from DE 31 37 975 C2 or DE 195 48 216 A1. Such electrical switches have a contact system for switching an electrical voltage. The electrical voltage is applied to electrical connections, which lead to the contact system.

On the one hand, control switches are used which directly switch the voltage supply for the respective appliance to be switched in the motor vehicle. In this case, high currents of approximately 10 to 15 amperes may flow via the contact system of the switch for such appliances. For example, the voltage for the motor vehicle lighting headlights may be switched directly. Such switches must therefore be suitable for switching high power currents.

On the other hand, control switches are also increasingly being used to select individual functions in a controller which, for its part, then switches the corresponding electrical appliances. These switches are used to produce switching signals for which only low currents of about 10 milliamps flow. For example, this may be used to select the internal locking on the central locking system for the doors, or for controlling the vehicle computer etc. Such switches are thus designed to switch low signal currents.

Those switches which are designed for switching power currents are unsuitable for switching signal currents, and the converse is also true. Thus, until now, it has been necessary to provide different switch types in the motor vehicle, depending on the function. This increases stock-keeping costs, and complicates assembly, and it is impossible to preclude the possibility of assembly errors. In particular, control panels must be defined from the start with regard to what type of switch can be arranged at what point, so that a wide range of versions needs to be kept available, depending on the desired vehicle equipment.

SUMMARY OF THE INVENTION

The invention is based on the object of providing an electrical switch which has these different functional capabilities at the same time. In particular, the aim is to be able to switch a power and/or signal voltage in the motor vehicle using essentially one electrical switch type. In an extension, it is intended to simplify the formation of variants for control panels.

This object is achieved by the features of claim 1 for an electrical switch, and by the features of claim 9 for a switch arrangement.

The switch according to the invention has first electrical connections for supplying the contact system with a power voltage, as well as second electrical connections for supplying the contact system with a signal voltage. Optionally and if required, one connection can carry power current via the first electrical connections and/or signal current via the second electrical connections. Further refinements of the invention are the subject matter of the dependent claims.

For example, the operating member of the switch may be in the form of a rocker. For instance, two contact systems may be arranged in the housing of the switch. In the one, operated position, the rocker then acts on the one contact system in order to move it to the switched-on state. In the other, operated position the rocker moves the other contact system to the switched-on state. If desired, the one contact system may be used for switching the power voltage, and the other contact system for switching the signal voltage.

The switch housing may be mounted on a printed circuit board on which the supply lines for the signal voltage are located which, in turn, can optionally make contact with the second electrical connections of the switch. In the housing of the switch, the second electrical connections are preferably electrically connected to the contact system via a board. Lighting means for function and/or symbol lighting may also be arranged on the operating member on this board. The voltage for operation of the lighting means is likewise supplied via the second electrical connections.

The switching signals produced by the switch by means of the supplied signal voltage and corresponding to the switch position of the contact system can, according to one refinement, be transmitted via signal lines to a control circuit located on the printed circuit board. The switching signals can then be converted in the control circuit into bus signals, for example CAN bus signals, and can be transmitted to a bus line.

In one development, a holder which accommodates the first electrical connections is located on the lower face of the housing, in its central region, in such a manner that a plug can optionally be plugged on in order to supply the power voltage.

An opening which corresponds to the holder and whose shape and size allow the plug to pass through is in turn located in the printed circuit board. The second electrical connections are likewise located on the lower face of the housing. In particular, the second electrical connections are associated with the edge of the housing and are arranged adjacent to the holder. It is possible for the second electrical connections to be in the form of plug receptacles which are arranged in the form of a floating bearing with electrical connecting lines to the board in the housing of the switch. The second electrical connections can then be plugged onto associated plug contacts, which are located on the printed circuit board.

The contact system of the switch may be in the form of a snap-action system, which is known per se. In such a snap-action system, the operating member acts by means of an attachment on a bearing arm which is mounted on a connecting part such that it can move. The switching contact is in turn mounted in a blade bearing on the bearing arm such that it can move. A tension spring is attached on the one hand firmly in the housing and on the other hand in the switching contact, so that the switching contact interacts, with a switching action, with at least one fixed contact located on a further connecting part. If desired, there may also be two fixed contacts, between which the switching contact switches like a changeover switch. The connecting parts merge via an extension on one face into the first electrical connections. At least one connecting part leads via an extension on the other face to the board for the electrical connection to the second electrical connections.

The contact system of the switch is designed such that both the high power current and a low signal current can be switched. In one particular refinement of the invention, on the one hand the contact-making parts of the contact system, namely the switching contact and the fixed contact, are composed of a contact material that is suitable for power currents and, on the other hand, have a low electrical contact resistance. In order to reduce the contact resistance, it is possible to provide the contact-making parts with an electrically highly conductive layer, for example a gold layer or the like. In consequence, when the switch is used for switching signal currents, only a slight voltage drop occurs across the contact system. If necessary, when the switch is used for switching power currents, this layer may be destroyed or removed, with the voltage drop across the contact system being increased, although the functional capability of the switch is not adversely affected any more owing to the increased current density for power currents.

The switch according to the invention is used, in particular, in a switch arrangement for a control panel in a motor vehicle. In this case, a refinement of the switch is advantageous in which at least one resilient latching arm is arranged on the housing, so that the switch can be inserted in a clamped and/or locking manner into a supporting component. Conversely, the switch can be unlocked again and removed from the supporting component by applying a tool, a screwdriver or the like, to the latching arm. This tool has an arm, corresponding to the latching arm, for unlocking the latching arm, as well as an attachment which is connected to the arm for acting on the lower face of the housing. The switch can thus be pushed out of the supporting component on the side associated with the lower face of the housing.

In general, one control panel contains a plurality of such switches, which are each used for switching and/or initiating functions in the motor vehicle. In order to bring the control panel into use, and/or before the motor vehicle is brought into use, the control panel can be initialized by storing an assignment table in a storage device in the switch arrangement. The assignment table assigns each switch a function from the set of functions provided for the motor vehicle. The control circuit of the switching arrangement contains a processor, which is monitored by means of an external window watchdog module. Furthermore, the control circuit is provided with a voltage regulator assembly and is coupled to a bus system which is, for example, the CAN bus, by means of a high-speed transmission module as well as an upstream suppression inductor.

The control circuit uses the signals transmitted on the signal lines to detect the switching state of the respective switch in the switch arrangement. To this end, the control circuit can read the signal lines, for example by means of a multiplexing method, via analog/digital converters. On the basis of the assignment, stored in the storage device, for the respective operated switch, the control circuit then checks which function has been selected. If necessary, a bus signal which codes the respective function can then be generated in the control circuit, and this can be transmitted to the bus line. In order to minimize the current draw, the supply voltage for the electronic components of the switch arrangement can be switched to a sleep mode with a reduced current draw, and the signal voltage supply for the switches can be switched off.

The switches in the control panel often have function and/or symbol lighting, in which case the association between the function and/or symbol lighting and the respective switch is stored in the storage device during initialization. The function and/or symbol lighting can likewise be actuated by the control circuit and, if required, can also be dimmed by means of pulse-width modulation.

If the entire switch arrangement comprises a plurality of individual control panels, then the control panels may be independent from one another, and may each be in the form of a bus node. Each control panel is then initialized separately, using an assignment table. Furthermore, each control panel is connected to a bus line, and the information relating to the switching states of the switches arranged in the respective control panel is transmitted directly from the respective control panel to the bus line. In an alternative refinement, there is only one control panel, in the form of an independent master bus node, while the other control panels are in the form of slave bus nodes, which are dependent on the master bus node and have only basic functions of a bus node. The slave bus nodes transmit the information relating to the switching states of the switches arranged in the respective control panel via the bus line to the master bus node, without knowing the function of said information. The master bus node, which is initialized using an assignment table for all the control panels, then converts this received information into bus signals in accordance with the assignment table. In yet another refinement, the dependent control panels may also be in the form of only slave controllers without any bus function, in which case the slave controllers each have a serial interface. The slave controllers are connected to the master bus node by means of a serial data line, via the serial interfaces. The information relating to the switching states of the switches arranged in the respective control panel is then transmitted via the serial interface and the serial data line to the master bus node, which then converts this information into bus signals once again.

The advantages achieved by the invention are, in particular, that the electrical switch can be used universally. The appropriate plug just has to be plugged on to determine whether this is a load switch or a signal voltage switch. The switch may even be used as a load switch and as a signal voltage switch at the same time. This results in less stockkeeping, which in turn leads to cost savings. Furthermore, switch arrangements which use such switches can be designed more flexibly since the function associated with the respective switch does not need to be defined until the switch arrangement is initialized. Various versions of such control panels for motor vehicles can thus be kept in stock in modular form, at low cost, with the initialization for the respectively desired equipment variant being carried out only after being fitted in the motor vehicle. Furthermore, this also reduces the risk of incorrect items being fitted, thus leading to a considerable quality improvement.

BRIEF DESCRIPTION OF THE DRAWINGS

The accompanying drawings, which are incorporated herein and constitute part of this specification, illustrate presently preferred embodiments of the invention and, together with the general description given above and the detailed description given below, serve to explain features of the invention.

DETAILED DESCRIPTION OF THE PREFERRED EMBODIMENTS

Figure 1:
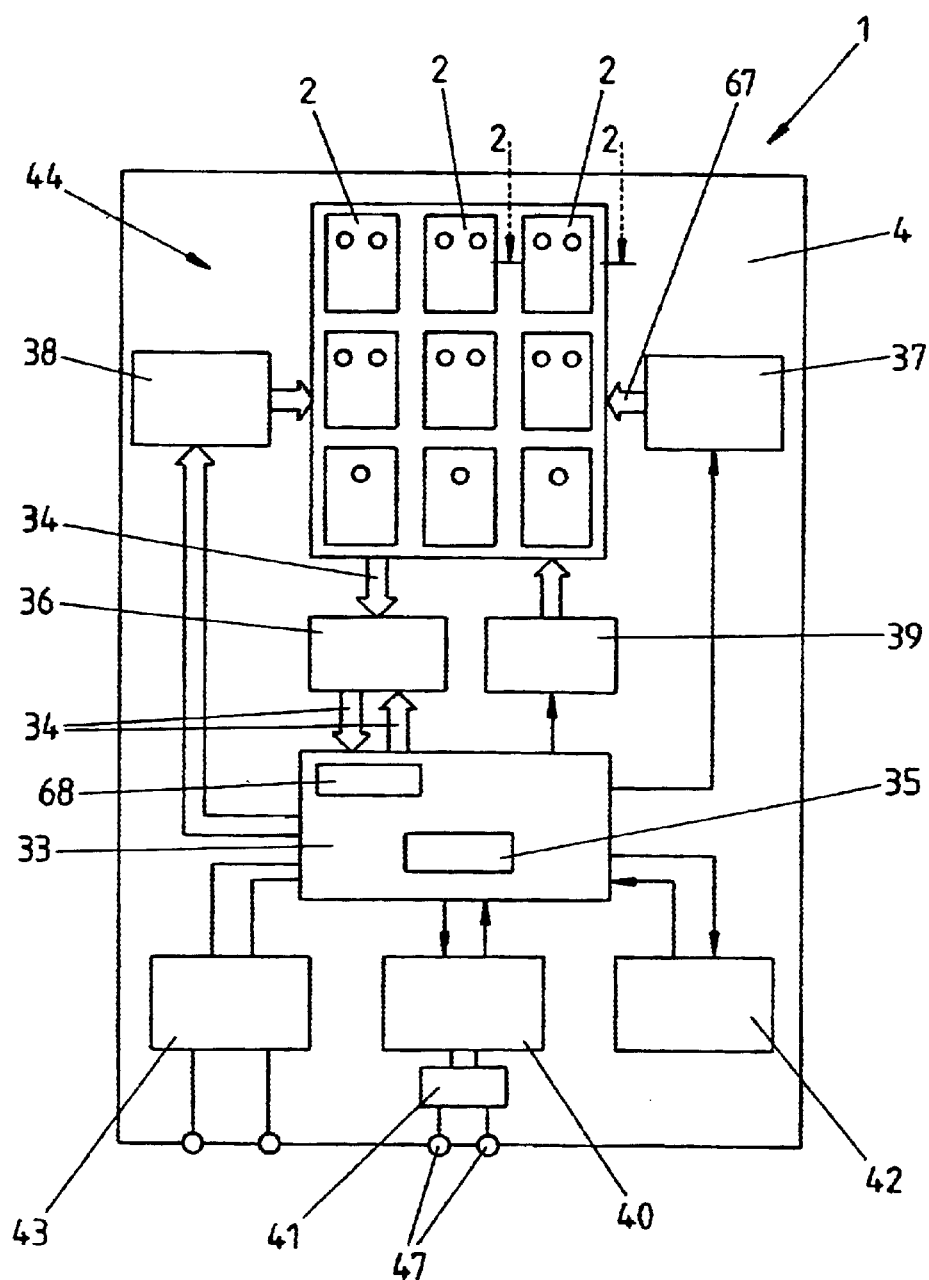
FIG. 1 shows a schematic block diagram of a switch arrangement for a control panel in a motor vehicle.

FIG. 1 contains a schematic block diagram of a switch arrangement 1 having a plurality of switches 2. The switch arrangement 1 is used as a control panel 44 in a motor vehicle, for example in a commercial vehicle, such a goods vehicle. The user uses the switches 2 to operate various functions in the motor vehicle. In the present case, the switch arrangement 1 comprises nine switches 2, denoted S1 to S9 to be more precise. The switch arrangement 1 contains not only switches 2 for switching power voltage, for example a switch S1 for switching the vehicle lighting on and off, but also a switch 2 for switching signal voltage, for example a switch S2 for operating a controller for the electric window winders.

Figure 2:
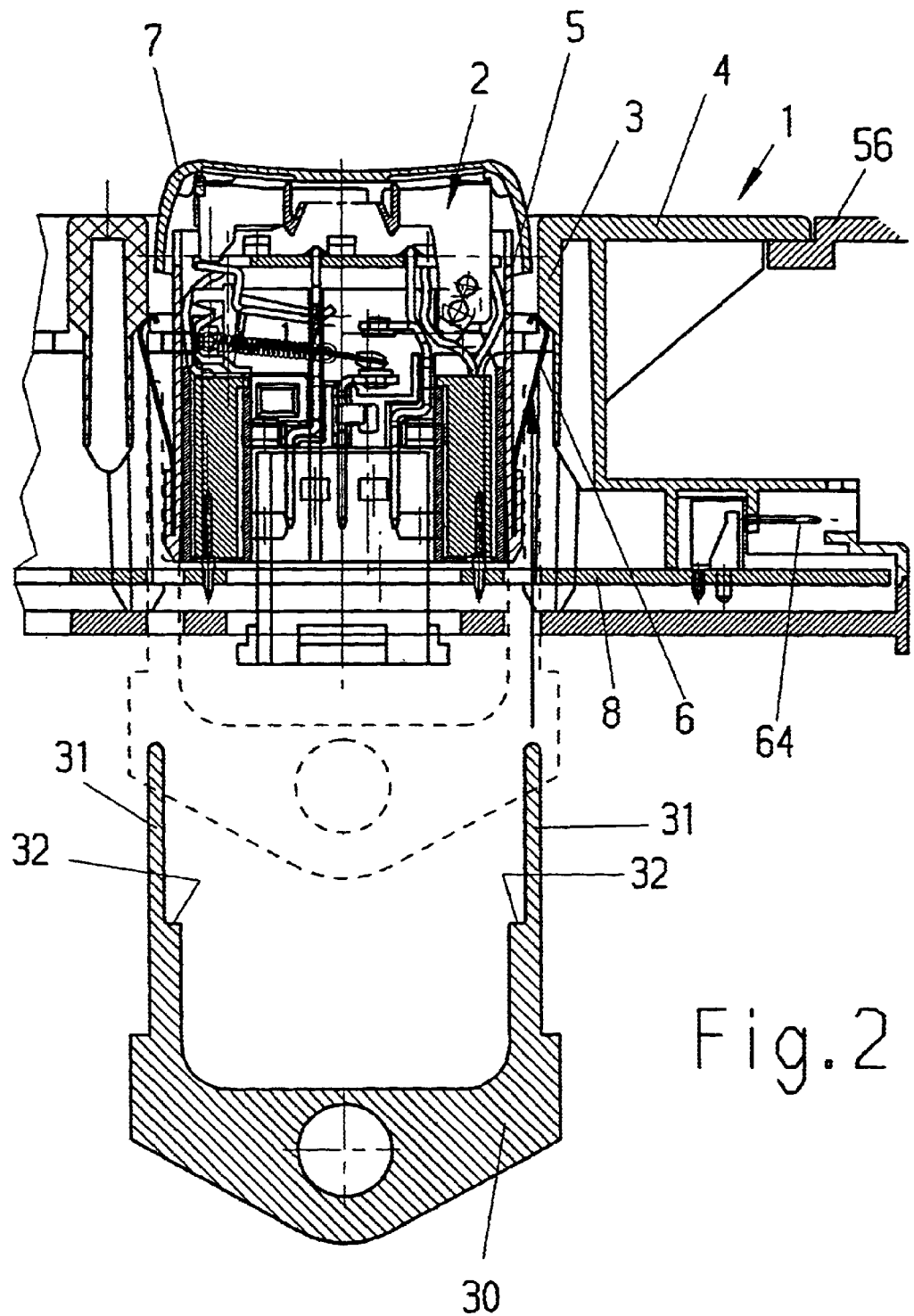
FIG. 2 shows a longitudinal section through the switch arrangement along the line 2—2 in FIG. 1.

A partial section through the switch arrangement 1 can be seen in more detail in FIG. 2. The switch arrangement 1 comprises a supporting component 3 which, for example, is fitted in the dashboard 56, or the center console or the like of the motor vehicle, and is provided on its upper face with a type of front panel 4. The electrical switches 2 each having a housing 5, on whose side walls resilient latching arms 6 are arranged. These latching arms 6 are used to hold the housing 5 of the switch 2 in a clamped and/or locking plugged-in manner on the supporting component 3, such that the operating member 7 of the switch 2 projects out of the front panel 4. The switch 2 can be connected to a printed circuit board 8 located in the supporting component 3.

Figure 3:
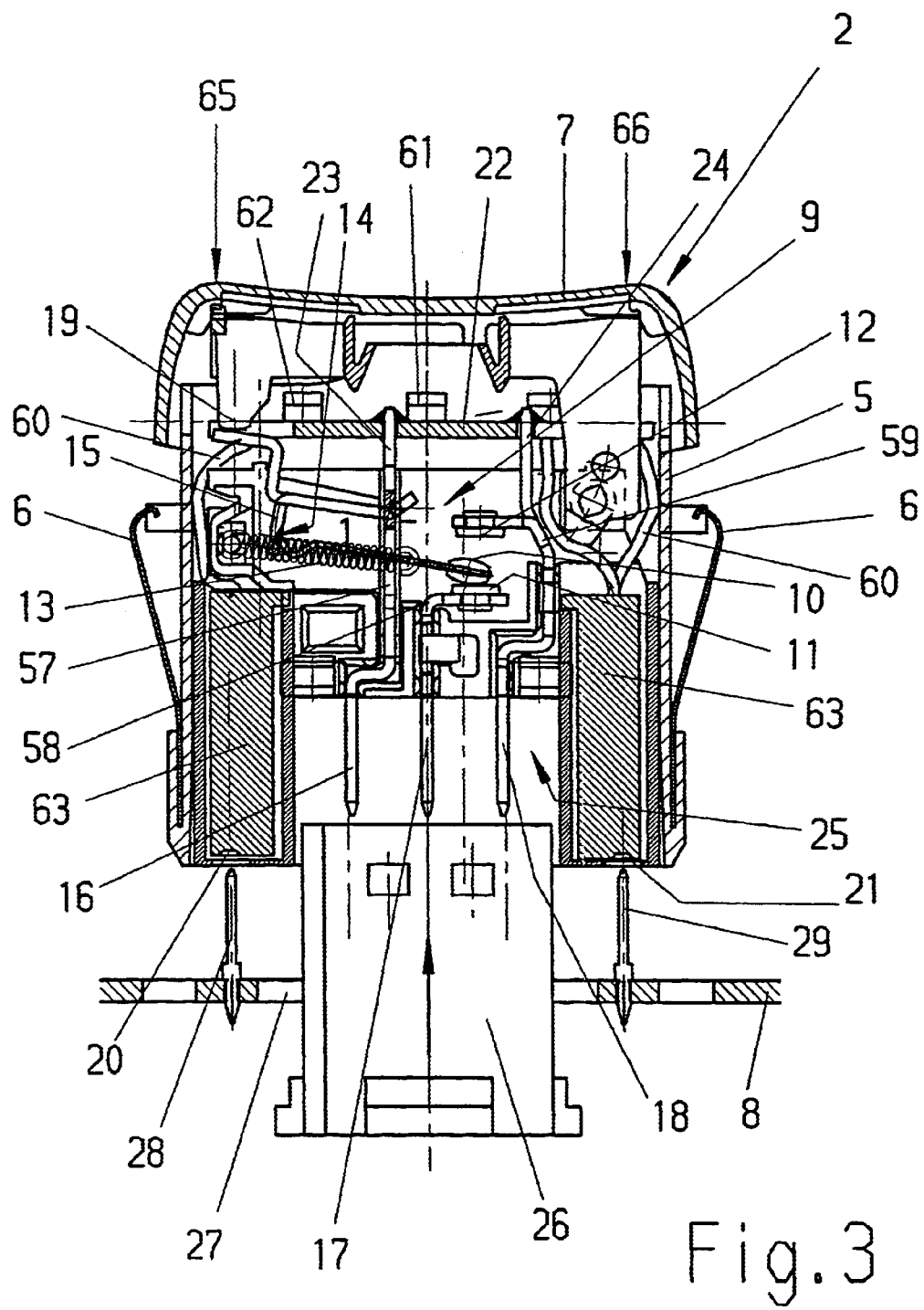
FIG. 3 shows a longitudinal section through the switch as shown in FIG. 2, enlarged.

FIG. 3 contains an enlarged illustration, showing the design of the switch 2 in more detail. The housing 5 contains at least one contact system 9. An operating member 7 which, in particular, is in the form of a rocker and is used in order to provide manual switching for the contact system 9 is arranged on the upper face of the housing 5. In such a rocker switch, it is possible, in particular, to arrange two contact systems 9 in the housing 5. When the rocker 7 is in the neutral position shown in FIG. 3, then the two contact systems 9 are in the switched-off state. If the user pushes one side 65 of the rocker 7, the rocker 7 is moved to the first, operated switch position and, in consequence, the first contact system 9 is moved to a switched-on state. In the second, operated position of the rocker 7, which is reached by pushing the other side 66 of the rocker 7, the second contact system 9 is then in a switched-on state.

The contact system 9 in the present case is in the form of a snap-action system, and comprises a tongue-like switching contact 10 and a fixed contact 12. The contact system 9 preferably has a further fixed contact 11. A tension spring 13 is attached on the one hand firmly to the housing 5 and on the other hand is attached in the switching contact 10. The switching contact 10 is mounted in a blade bearing 14 on a bearing arm 15 such that it can move and, for its part, the bearing arm 15 is mounted on an electrical connecting part 57 such that it can move. The operating member 7 acts by means of an attachment 19 on the bearing arm 15, so that the switching contact 10 interacts, with a switching action, with the fixed contacts 11, 12 located on further electrical connecting parts 58, 59 and, in particular, switches over between the two fixed contacts 11, 12 like a changeover switch.

The connecting parts 57, 58, 59 of the contact system 9 are lengthened toward the lower face of the housing 5 and, on this face, merge into electrical connections 16, 17, 18. The electrical connections 16, 17, 18 which are located on the housing 5 and lead to the contact system 9 are used as first electrical connections 16, 17, 18 for application of a first voltage in the form of a power voltage for a high power current. Furthermore, second electrical connections 20, 21 are located on the housing 5, which are used for application of a second voltage, in the form of a signal voltage for a low signal current, as will be explained in more detail in the following text. The contact system 9 is now designed in such a way that both high power currents which are, for example, approximately 10 to 15 A, for a high power, as well as low signal currents which are, for example, up to approximately 10 mA, for a low power, can be switched. In consequence, optionally and if required, the power current can be connected via the first electrical connections 16, 17, 18, and/or the signal current can be connected via the second electrical connections 20, 21 on the electrical switch 2. As can be seen, the electrical switch 2 according to the invention is thus designed such that it is suitable for use not only as a load switch but also as a signal switch. The decision as to whether this is a load switch, a signal switch or a combined load/signal switch is made only by virtue of the connection to the corresponding connections 16, 17, 18 or 20, 21. This configuration of the switch 2 advantageously results in reduced stock-keeping and a more flexible control panel in the motor vehicle.

The contact system 9 is expediently designed in such a manner that, on the one hand, it contains a contact material that is suitable for power currents and, on the other hand, has a low electrical contact resistance. For example, a silver-nickel alloy, such as AgNi10, is suitable for use as the contact material for the contact-making parts of the contact system 9, namely the switching contact 10 and the fixed contact 11, 12. In order to reduce the contact resistance, the contact-making parts of the contact system 9 may be provided with an electrically highly conductive layer, with a gold layer or some other noble metal layer being suitable for use as the coating. This ensures that only a low voltage drop occurs across the contact system 9 when the switch 2 is used for switching signal currents. When the switch 2 is used for switching power currents, this layer may admittedly possibly be destroyed or removed, thus resulting in an increase in the voltage drop across the contact system 9. However, since the power currents are high currents, an adequate contact is nevertheless always ensured.

One face, to be precise expediently the lower face, of the housing 5 of the switch 2 can be mounted on the printed circuit board 8. A holder 25, with which accommodates the first electrical connections 16, 17, 18, is located on one face, to be precise preferably on the lower face, of the housing 5. A plug 26 for supplying the power voltage can optionally be plugged into this holder 25. To this end, the holder 25 is located in the central region of the housing 5 and an opening 27, which corresponds to the holder 25 and whose shape and size allow the plug 26 to pass through, is located in the printed circuit board 8. When the plug 26 is plugged on, the power voltage is then connected to the connections 16, 17, 18, via the contact system 9, when the user operates the operating member 7.

Supply lines in the form of conductor tracks for the signal voltage are located on the printed circuit board 8. The second electrical connections 20, 21, which are located on the side with the holder 25, and thus likewise on the lower face of the housing 5, can optionally make contact with these conductor tracks. The second electrical connections 20, 21 are expediently associated with the edge of the housing 5, and are arranged adjacent to the holder 25. It is possible for the second electrical connections 20, 21 to be in the form of plug receptacles 63, which are arranged in the manner of a floating bearing or a latched-in attachment in the housing 5. The housing 5 can then be plugged, with the plug receptacles 63 of the second electrical connections 20, 21, onto corresponding plug contacts 28, 29, which are located on the printed circuit board 8 and originate from the conductor tracks. Electrical connecting lines 60 lead from the second electrical connections 20, 21 to a board 22 that is located in the housing 5 of the switch 2.

The board 22 is in turn electrically connected to the contact system 9. To this end, the connecting part 57 for the switching contact 10 is provided with an extension 23 in the direction of the upper face of the housing 5. The connecting part 59 for the fixed contact 12 likewise has an extension 24. The two extensions 23, 24 are soldered to the board 22, and produce the electrical connection to the respective connecting lines 60. A lighting means such as a light-emitting diode 61 or the like is located on the board 22, which lighting means is associated with the operating member 7 and is used to illuminate the functional lighting on the operating member 7. A further light-emitting diode 62 on the board 22 is used for symbol lighting on the operating member 7. The voltage for operation of the light-emitting diodes 61, 62 is likewise supplied via the second electrical connections 20, 21 and the connecting lines 60.

Switching signals are produced by means of the signal voltage supplied to the switch 2, depending on the switch position of the contact system 9, which is set manually via the operating member 7. This is the "first switch position" switching signal when the switching contact 10 is in contact with the fixed contact 11, and "second switch position" when the switching contact 10 is in contact with the fixed contact 12. This switching signal is supplied via the plug receptacle 20, 21 to the supply lines 34 on the printed circuit board 8, and is also transmitted to a control circuit 33 located on the printed circuit board 8, as can be seen in FIG. 1. The switching signals can be converted in the control circuit 33 into bus signals, for example CAN bus signals, and are then transmitted from the control circuit 33 to a bus line 47, which is connected to the control circuit 33 by means of a plug 64 that is shown in FIG. 2.

As can be seen from FIG. 2, the switch 2 can be unlocked, and can be removed from the supporting component 3, by applying a tool 30 to the latching arm 6. The tool 30 has an arm 31 corresponding to the latching arm 6, as well as an attachment 32 connected to the arm 31. The latching arm 6 can be unlocked by means of the arm 31. At the same time, the attachment 32 acts on the lower face of the housing 5, so that the switch 2 can easily be pushed out of the supporting component 3, if required, on the side associated with the lower face of the housing 5. If required, a screwdriver or the like may also be used to unlock the latching arm 6.

As already stated, the switch arrangement 1 (shown in FIG. 1) for a control panel 44 contains a plurality of switches S1 to S9, which are preferably designed in a manner corresponding to the described switch 2. The control panel 44 has a control circuit 33 comprising, for example, a microprocessor. A supply line 67 for the signal voltage to the switches S1 to S9 leads to the second electrical connections 20, 21. Furthermore, signal lines 34 lead from the control circuit 33 to the individual switches S1 to S9, which are used to transmit signals, to be precise in particular switching signals, between the control circuit 33 and the switches S1 to S9. The switch arrangement 1 also has a storage device 35 which may possibly be integrated in the control circuit 33, as an EEPROM. An assignment, in particular in the form of an assignment table, is stored in this storage device 35 and assigns each individual switch S1 to S9 a function, from a set of functions, which can be switched by the respective switch and/or can be initiated by the control circuit 33.

The switch arrangement 1 is initialized by storing the assignment table in the storage device 35, in order to bring the control panel 44 into use and/or before bringing the motor vehicle into use as well. During the initialization process, the assignment of the switches S1 to S9 to the respective function is defined. The control circuit 33 thus knows which switch S1 to S9 is located at what point in the switch arrangement 1 in the control panel 44. In consequence, this measure provides a highly flexible switch arrangement 1, in which it is even possible to assign the switches S1 to S9 as required.

The operation of a switch S1 to S9 in the switch arrangement 1 can be detected by the user by means of the signals transmitted from the control circuit 33 on the signal lines 34. To do this, the control circuit 33 reads the signal lines 34, for example using a multiplexing method, via a multiplexer 36 and an analog/digital converter 68 integrated into the control circuit 33. Once it has been found which of the switches S1 to S9 and, if appropriate, which contact system 9 in the switch S1 to S9 has been operated, the control circuit 33 uses the assignment table for the operated switch 2 to determine what function has been selected. Then, if necessary, a bus signal corresponding to the respective function can be generated in the control circuit 33. In a motor vehicle, the bus signal is preferably a CAN message. The control circuit 33 is furthermore coupled to the bus line 47 by means of a transceiver or high-speed transmission module 40 with an upstream suppression inductor 41, so that the bus signal is transmitted via the bus line 47 to the appropriate controllers in the motor vehicle.

If desired, the switches S1 to S9 may have function and/or symbol lighting. The assignment of the function lighting to the respective switches S1 to S9 is also stored in the assignment table. The function lighting for the switches S1 to S9 can be actuated by the control circuit 33 by means of a driver module 38 which, for example, is integrated in a shift-register module, in order to save supply lines. When the control circuit 33 finds that one of the switches S1 to S9 has been operated, it then actuates the associated function lighting, providing the user with an acknowledgement that the switch S1 to S9 has been operated. The symbol lighting, which indicates the respective function of the switch S1 to S9 to the user on the operating member 7, is likewise supplied with voltage via an appropriate driver module 39. The function and/or symbol lighting can be dimmed, if required, by means of pulse-width modulation by the control circuit 33, in order to reduce the brightness at night, in order to avoid dazzling. The dimming can be initiated, for example, by means of an appropriate bus message, which is supplied to the control circuit 33 via the bus line 47.

The processor in the control circuit 33 is monitored by means of an external window watchdog module 42, so that incorrect states can be identified and corrected in the processor of the control circuit 33. Furthermore, the control circuit 33 is provided with a voltage regulator assembly 43 which, in particular, is matched to the requirements of the commercial vehicle field, for example to the goods vehicle field. Finally, the supply voltage for the electronic components in the control panel 44 can be switched, like the control circuit 33, etc, to a sleep mode with a reduced current draw, in order to minimize the current consumption. The signal voltage supplied via the supply line 67 for the switches S1 to S9 can also be switched on and off by the control circuit 33, by means of an electronic switching module 37.

Figure 7:
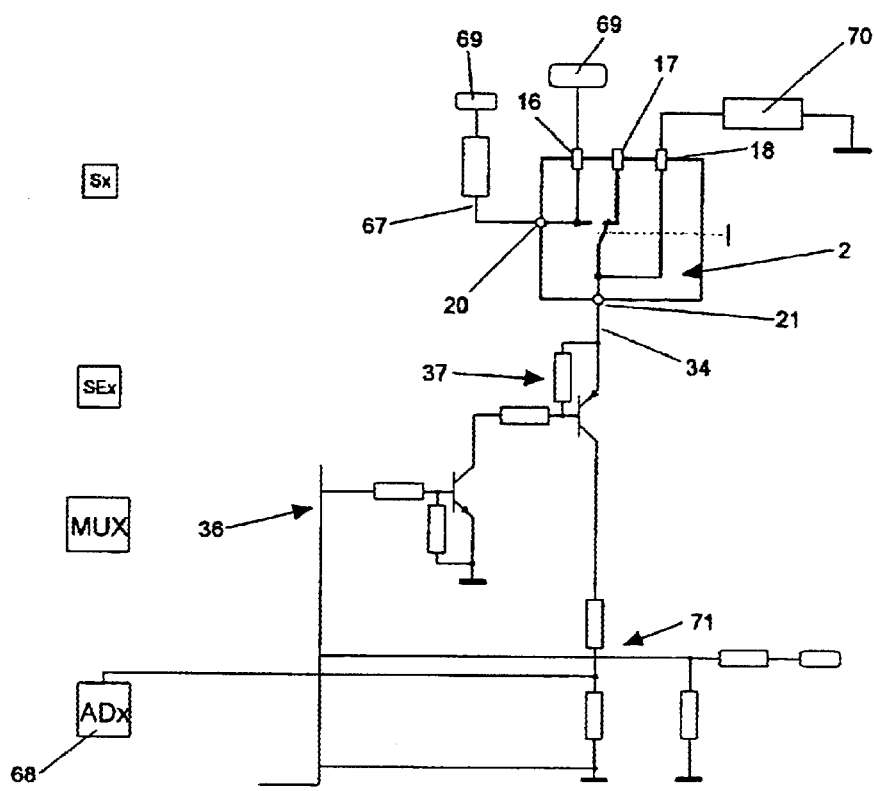
FIG. 7 shows an outline circuit diagram of the electronic circuitry of a switch in the control panel.

FIG. 7 shows an outline circuit diagram of the described circuitry of the switch 2 in the control panel 44 in more detail. The motor vehicle battery 69 is optionally connected by means of the first electrical connections 16, 17, 18, and via the switch 2, to the electrical load 70 to be switched. The battery 69 can optionally also be connected via the supply line 67 to the second electrical connection 20, in order to supply the signal voltage to the switch 2. The signal line 34, whose other, second electrical connection 21 is connected to the switch 2, is connected to the electronic circuit module 37, from there to the multiplexer 36 and, finally, to a voltage divider 71, to which the analog/digital converter 68 in the control circuit 33 is connected. As can be seen from the circuit diagram, not only is it alternatively possible for the power voltage to be connected to the first electrical connections 16, 17, 18, or the signal voltage to be connected to the second electrical connections 20, 21, but the power voltage and the signal voltage can also be connected at the same time to the first and second electrical connections 16, 17, 18, 20, 21, with the desired function of the control panel 44 always being ensured.

Figure 4:
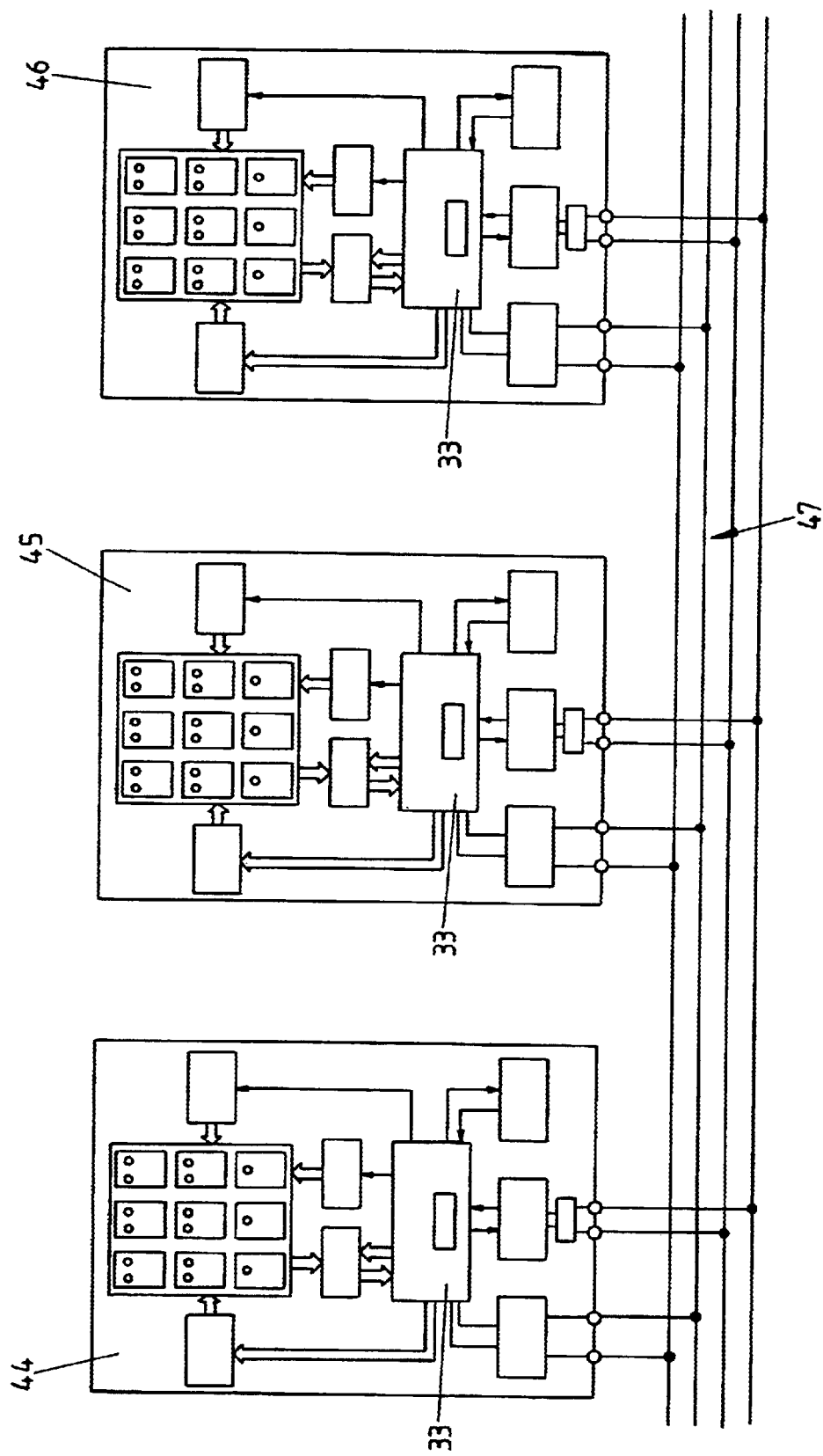
FIG. 4 shows, schematically, a switch arrangement having a plurality of control panels.
Figure 5:
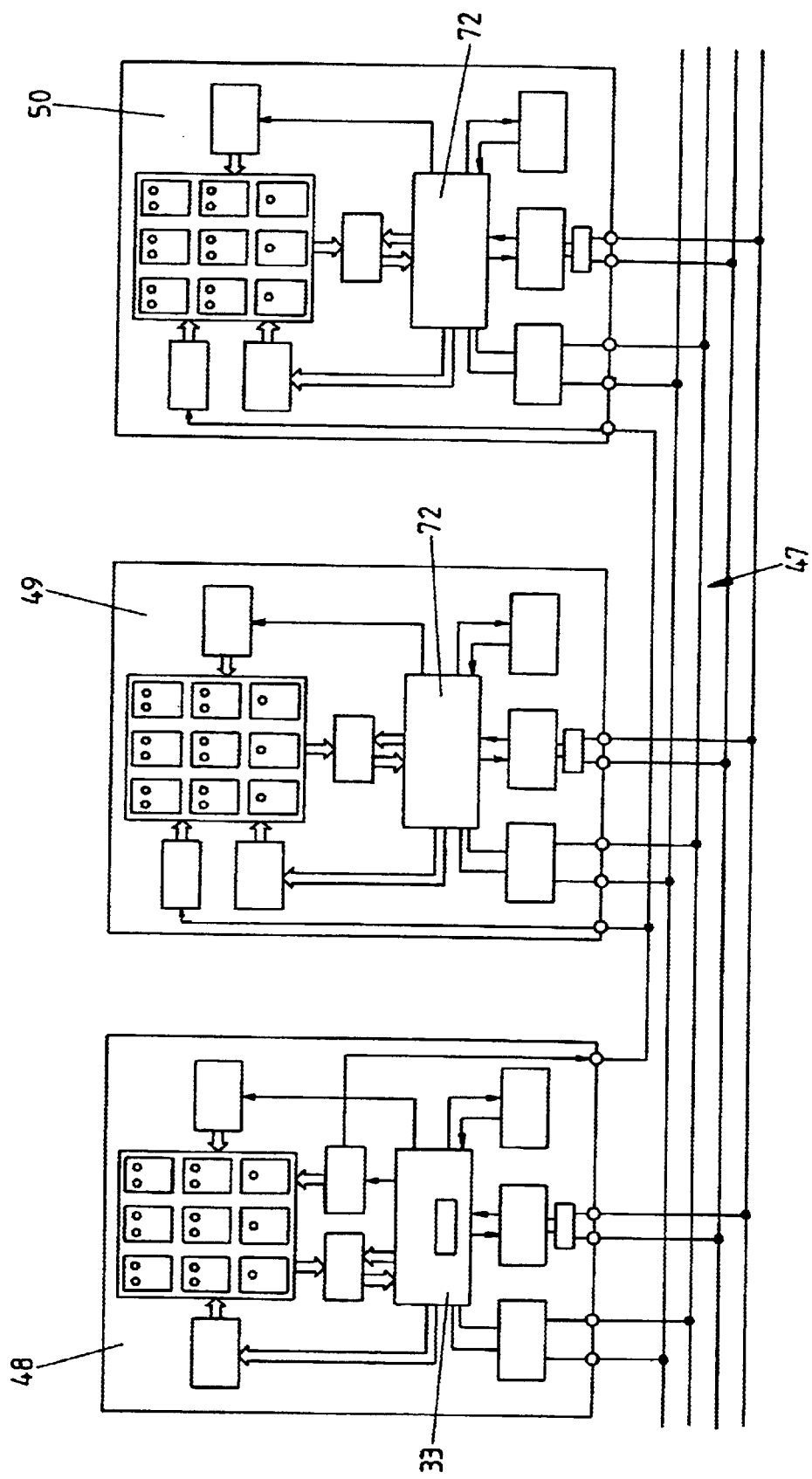
FIG. 5 shows, schematically, another embodiment of a switch arrangement having a plurality of control panels.
Figure 6:
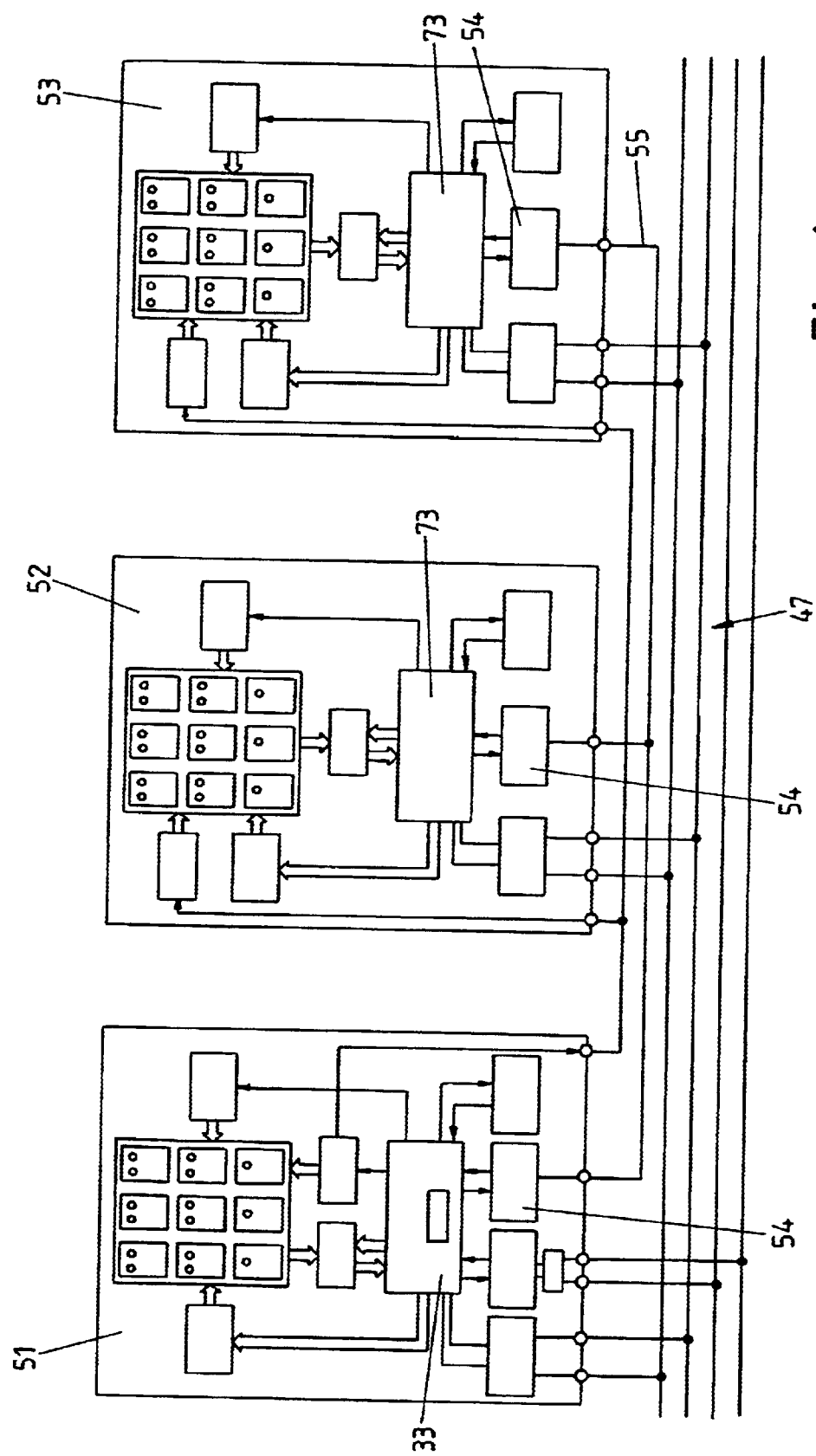
FIG. 6 shows, schematically, yet another embodiment of a switch arrangement having a plurality of control panels.

FIGS. 4 to 6 show even more exemplary embodiments for such switch arrangements in motor vehicles.

According to the embodiment shown in FIG. 4, the switch arrangement comprises a plurality of control panels 44, 45, 46. The control panels 44, 45, 46 are independent of one another and are each in the form of a bus node, namely a CAN node. Each control panel 44, 45, 46 is initialized separately, using an assignment table. Owing to the independence of the individual control panels 44, 45, 46, the information relating to the switches S1 to S9 arranged in the respective control panel 44, 45, 46 is transmitted directly from the respective control panel 44, 45, 46 to the bus line 47. Furthermore, the dimming of the function and/or symbol lighting by the control circuit 33 is also initiated automatically in each control panel 44, 45, 46 on the basis of the information transmitted via the bus line 47.

In the further embodiment which can be seen in FIG. 5, the switch arrangement comprises a plurality of control panels 48, 49, 50. Each control panel 48, 49, 50 is in the form of a bus node, namely a CAN node, but one control panel 48 is designed to be independent, as a master bus node, and the other control panels 49, 50 are designed as slave bus nodes that are dependent on the master bus node. The control panels 49, 50 are equipped only with the basic functions of a bus node and have a control circuit 72 which comprises a simpler processor. The control panels 49, 50 which are used as slave bus nodes transmit the information to the switches S1 to S9 arranged in the respective control panel 49, 50, without knowing the function of this information, via the bus line 47 to the control panel 48 which is used as the master bus node. The control panel 48 then converts the information received from the control panels 49, 50 into the correct bus messages, on the basis of the assignment table, which is stored during initialization, for all the control panels 48, 49, 50. The supply voltage for the pulse-width modulation for dimming the function and/or symbol lighting is generated by the control circuit 33 in the control panel 48 for all the control panels 48, 49, 50.

In the case of yet another embodiment, which is shown in FIG. 6, the switch arrangement likewise comprises a plurality of control panels 51, 52, 53. Once again, one control panel 51 is designed to be independent, as the master bus node, namely as a CAN node. The other control panels 52, 53 are once again designed as slave controllers which are dependent on the master bus node, although the control panels 52, 53 do not have a bus node and are equipped with an even simpler processor for the control circuit 73. The control panels 51, 52, 53 are also each equipped with a serial interface 54, with the serial interfaces 54 of the control panels 51, 52, 53 being connected to one another via a data line 55. Those control panels 52, 53 which are in the form of slave controllers transmit the information relating to the switches S1 to S9 arranged in the respective control panel 52, 53, via the data line 55 and the serial interfaces 54, without knowing the function of this information, to the control panel 51 that is used as the master bus node. The control panel 51 then converts the information received from the control panels 52, 53 into the correct bus messages based on the assignment table stored during initialization for all the control panels 51, 52, 53, and then transmits these bus signals to the bus line 47. The supply voltage for pulse-width modulation for dimming the function and/or symbol lighting is once again generated by the control circuit 33 for all the control panels 51, 52, 53.

The invention is not limited to the exemplary embodiments described and illustrated. In fact, it also covers all developments familiar to a person skilled in the art in the context of the idea of the invention. For example, the switch according to the invention or the switch arrangement according to the invention can be used not only in motor vehicles but also in machine tools, domestic appliances or the like.

What is claimed is:

1. An electrical switch comprising:
   a first contact system comprising at least one fixed contact and one switching contact, the first contact system being designed for switching a high power current as well as a low signal current; and
   a plurality of electrical connections which lead to the first contact system, wherein the electrical connections comprise first electrical connections for application of a first voltage in the form of a power voltage for a high power current, and second electrical connections for application of a second voltage in the form of a signal voltage for a low signal current, the first electrical connections and the second electrical connections being electrically connected to only the one first contact system, in that, one connection can carry at least one of the power current via the first electrical connections and the signal current via the second electrical connections to the contact system.

2. The electrical switch according to claim 1, wherein the first contact system is located in a housing of the switch, in that, the electrical connections are located on the housing on a lower face, and in that, an operating member which is in the form of a rocker is arranged on the housing on an upper face, in order to provide manual switching for the first contact system and in that a further, second contact system is arranged in the housing in that, when the rocker is in a first, operated switch position, the first contact system is in a switched-on state and, when the rocker is in a second, operated switch position, the second contact system is in a switched-on state.

3. The electrical switch according to claim 2, wherein the lower face of the housing is mounted on a printed circuit board, in that, supply lines for the signal voltage are located on the printed circuit board, in which case the second electrical connections can make contact with the supply lines, in that, furthermore, the second electrical connections are electrically connected to the first contact system via a board located in the switch, in that, furthermore and in addition, the switching signals which are produced by the switch by means of the supplied signal voltage and depending on the switch position of the first contact system, can be transmitted to a control circuit located on the printed circuit board, and the switching signals can be converted in the control circuit into bus signals, the bus signals being CAN bus signals, which can be transmitted from the control circuit to a bus line.

4. The electrical switch according to claim 3, wherein a holder is located on the lower face of the housing and accommodates the first electrical connections to receive a plug in order to supply the power voltage, in that, the holder is located in a central region of the housing, and in that, furthermore, an opening which corresponds to the holder and whose shape and size allow the plug to pass through is located in the printed circuit board.

5. The electrical switch according to claim 4, wherein the second electrical connections are located on the lower face of the housing and adjacent to the holder, in that, the second electrical connections are in the form of plug receptacles, which are in the form of a floating bearing or a latched-in attachment, are arranged with electrical connecting lines to the board in the housing in that, the second electrical connections can be plugged onto associated plug contacts which are located on the printed circuit board.

6. The electrical switch according to claim 5, wherein at least one resilient latching arm is arranged on the housing, so that the switch can be plugged in a locking manner into a supporting component which contains a plurality of switches in a switch arrangement for a control panel, and in that, the switch can be unlocked and removed from the supporting component by applying a tool, to the latching arm, in which case, furthermore, the tool has an arm, which corresponds to the latching arm for unlocking the latching arm, and an attachment which is connected to the arm for acting on the lower face of the housing, in that, the switch can be pushed out of the supporting component on the face associated with the lower face of the housing.

7. The electrical switch according to claim 6, wherein the first contact system is in the form of a snap-action system, with, in the case of the snap-action system, the operating member acting on a bearing arm by means of an attachment, with the bearing arm being mounted on a connecting part such that it can move, with the switching contact in turn being mounted in a blade bearing on the bearing arm such that it can move, and with a tension spring being on the one hand attached firmly in the housing and on the other hand being attached in the switching contact, so that the switching contact interacts, with a switching action with at least one fixed contact located on a further connecting part switching over between two fixed contacts, in that, the connecting parts merge via an extension on one face into the first electrical connections, in that, furthermore, at least one connecting part leads via an extension on the other face to the board for the electrical connection to the second electrical connections, and in that, at least one light-emitting diode, which is associated with the operating member, for function and/or symbol lighting, is arranged on the operating member on the board, with the voltage supply for operation of the light-emitting diode passing via the second electrical connections.

8. The electrical switch according to claim 7, wherein the first contact system, on the one hand, contains a contact material that is suitable for power currents and, on the other hand, has a low electrical contact resistance, the contact-making parts of the first contact system being the switching contact and the fixed contact, are provided with an electrically highly conductive layer, such that, when the switch is used for switching signal currents, only a slight voltage drop occurs across the first contact system, and, when the switch is used for switching power currents, this layer may be destroyed or removed, increasing the voltage drop across the first contact system.

9. A switch arrangement for a control panel in a motor vehicle having a plurality of switches according to claim 1, the switch arrangement comprising:
   a control circuit;
   a plurality of signal lines from the control circuit to the switches for transmitting signals between the control circuit and the switches; and
   a storage device used to store an assignment, the storage device assigns each individual switch one function, from a set of functions, which can be switched by the respective switch and/or can be initiated by the control circuit.

10. The switch arrangement according to claim 9, wherein, before at least one of the control panel and the motor vehicle is activated by a user, the control panel can be initialized by storing the assignment, the assignment being an assignment table, in the storage device, in that, the control circuit contains a processor, with the operation of the control circuit being monitored by means of an external window watchdog module, in that, furthermore, the control circuit is provided with a voltage regulator assembly which is designed to satisfy the requirements in the commercial vehicle field, and in that, the control circuit is coupled to a bus the bus being a CAN bus, by means of a high-speed transmission module and, with an upstream suppression inductor.

11. The switch arrangement according to claim 10, wherein, the switching state of each of the plurality of switches can be determined by the control circuit on the basis of the signals transmitted on the signal lines by the control circuit reading the signal lines using a multiplexing method via analog/digital converters, in that, the assignment stored in the storage device is used to check an operated switch in the control circuit to determine which function has been selected, in that, a bus signal which codes the respective function, the bus signal being a CAN bus signal, can be generated in the control circuit, and in that, furthermore, the supply voltage for the electronic components, the electronic components being the control circuit, can be switched to a sleep mode, with a reduced current draw, in order to minimize the current consumption, and the signal voltage supply for the switches can be switched off.

12. The switch arrangement according to claim 11, wherein at least one switch has at least one of function and symbol lighting, in that, the assignment of the function and/or symbol lighting to the respective switch is stored in the storage device, in that, furthermore, the at least one of function and symbol lighting can be actuated by the control circuit via associated drivers by means of shift register modules with integrated drivers, and in that the at least one of function and symbol lighting can be dimmed, as required, by means of pulse-width modulation, in which case the dimming can be initiated by the control circuit on the basis of a bus signal.

13. The switch arrangement according to claim 9, wherein the switch arrangement comprises a plurality of control panels which are independent of one another and are each in the form of a bus node, the bus node being a CAN node, in that, each control panel is initialized separately, using an assignment table, in that, the control panels are connected to a bus line, and in that, the information relating to the switching states of the switches arranged in the respective control panel is transmitted directly from the respective control panel to the bus line.

14. The switch arrangement according to claim 9, wherein the switch arrangement comprises a plurality of control panels which are each in the form of a bus node, each bus node being a CAN node, with one control panel being in the form of an independent master bus node and the other control panels being in the form of slave bus nodes which are dependent on the master bus node and have only basic functions of a bus node, in that, only the master bus node is initialized using the assignment table for all the control panels, in that, the slave bus nodes transmit the information relating to the switching states of the switches arranged in the respective control panel via the bus line to the master bus node without knowing the function of said information, and in that, the master bus node uses the assignment table to convert the information received from the slave bus nodes into bus signals, and then transmits these bus signals to the bus line.

15. The switch arrangement according to claim 9, wherein the switch arrangement comprises a plurality of control panels, with one control panel being in the form of an independent master bus node, the master bus node being a CAN node, and the other control panels being in the form of slave controllers which are dependent on the master bus node, in that, the control panels each have a serial interface and are connected to the master bus node by means of a serial data line and via the serial interfaces, in that, only the master bus node is initialized using the assignment table for all the control panels, in that, the slave controllers transmit the information relating to the switching states of the switches arranged in the respective control panel via the serial interface and the serial data line to the master bus node without knowing the function of this information, and in that, the master bus node converts the information received from the slave controllers into bus signals using the assignment table, and then transmits these bus signals to the bus line.

* * * * *